United States Patent [19]
Basu et al.

[11] 3,914,049
[45] Oct. 21, 1975

[54] OPTICAL SCANNING SYSTEM

[75] Inventors: Samir K. Basu, Stevenage; Roger D. Masham, Biggleswade, both of England

[73] Assignee: Xerox Corporation, Stamford, Conn.

[22] Filed: May 20, 1974

[21] Appl. No.: 471,521

[30] Foreign Application Priority Data
May 23, 1973 United Kingdom............... 24564/73

[52] U.S. Cl.................................... 355/68; 355/68
[51] Int. Cl.².......................................... G03B 7/08
[58] Field of Search....................................... 355/68

[56] References Cited
UNITED STATES PATENTS
2,853,921  9/1958  Biedermann.......................... 355/68
3,020,801  2/1962  Lander................................. 355/68

*Primary Examiner*—John M. Horan

[57] ABSTRACT

A photocopying optical system in which an object is scanned and imaged through an aperture on a photoreceptor surface. A photodetector is disposed adjacent to the aperture to receive light propagating from the object and from adjacent platen area exposed by the object. The photodetector senses the level of irradiance of the object and this signal is fed back to control the intensity of the light source. A platen cover is configured to reflect light at an angle from the normal to the platen so as to avoid reflecting directly at the photodetector.

4 Claims, 4 Drawing Figures

OPTICAL SCANNING SYSTEM

BACKGROUND OF THE INVENTION

The invention relates to scanning systems, primarily though not exclusively for document copying machines. The invention has particular application where an image of a stationary original is projected onto a movable photosensitive surface.

A copying machine such as that described in U.S. Pat. No. 3,062,109 uses an optical system comprising two fixed mirrors with a lens between the mirrors, the stationary original being illuminated by lamps on a movable lamp carriage, and light from the original being screened from the projection system except for a small slit between the lamps. U.S. Pat. No. 3,301,126 describes a document copying machine in which the whole of the stationary original is illuminated during exposure, and scanning is achieved by oscillating one of the mirrors of the projection system about an axis in its plane. It has been proposed, for example in U.S. Pat. No. 3,642,366 to have a more compact image projection system in which two mirrors are moved in different directions at speeds relating to the speed of movement of the photosensitive surface.

In copiers having optical systems of the kind already mentioned and generally any copier relying on a photosensitive response, it may be desirable to adjust the illumination of the document to be copied to maintain as far as possible a constant irradiance at the image plane, that is at the photosensitive surface or photoreceptor. This constant irradiance is desirably achieved for various original document background reflectances and as far as practical in some cases despite aging or other forms of deterioration of the optical system.

In the above copier, copies provided depend for their definition or contrast on the difference of light intensity between light and dark parts of an original document to be copied so that adjustment of the illumination of the document may not be critical. In a copier as described in U.S. Pat. No. 3,084,043, the definition of copies made depends on the actual value of the illumination received, rather than a differential value, so that ensuring near constant irradiance at the photoreceptor surface for differing types of original becomes even more important.

SUMMARY OF THE INVENTION

It is an object of the present invention to provide an optical scanning system including a light intensity detector means.

According to the present invention there is provided an optical scanning system for scanning a document to be copied providing an optical path and including document illuminating means, light intensity detector means having a line of sight at least adjacent said optical path, and a document cover arranged to reflect light incident thereon from said document illuminating means generally along said optical path but out of the line of sight of said light intensity detector means.

An optical slit may be provided in the optical path, and the light detecting means arranged adjacent said slit.

The document cover may have a reflective surface comprising a silvered layer. The document cover may have a reflective surface formed of a plurality of angled mirrors.

DRAWINGS

The invention will now be described by way of example with reference to the accompanying drawing in which.

DESCRIPTION

Figure 2:
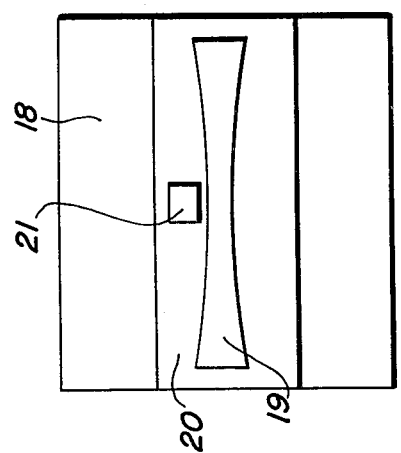
FIG. 2 shows a view taken along the line A—A of FIG. 1.
Figure 1:
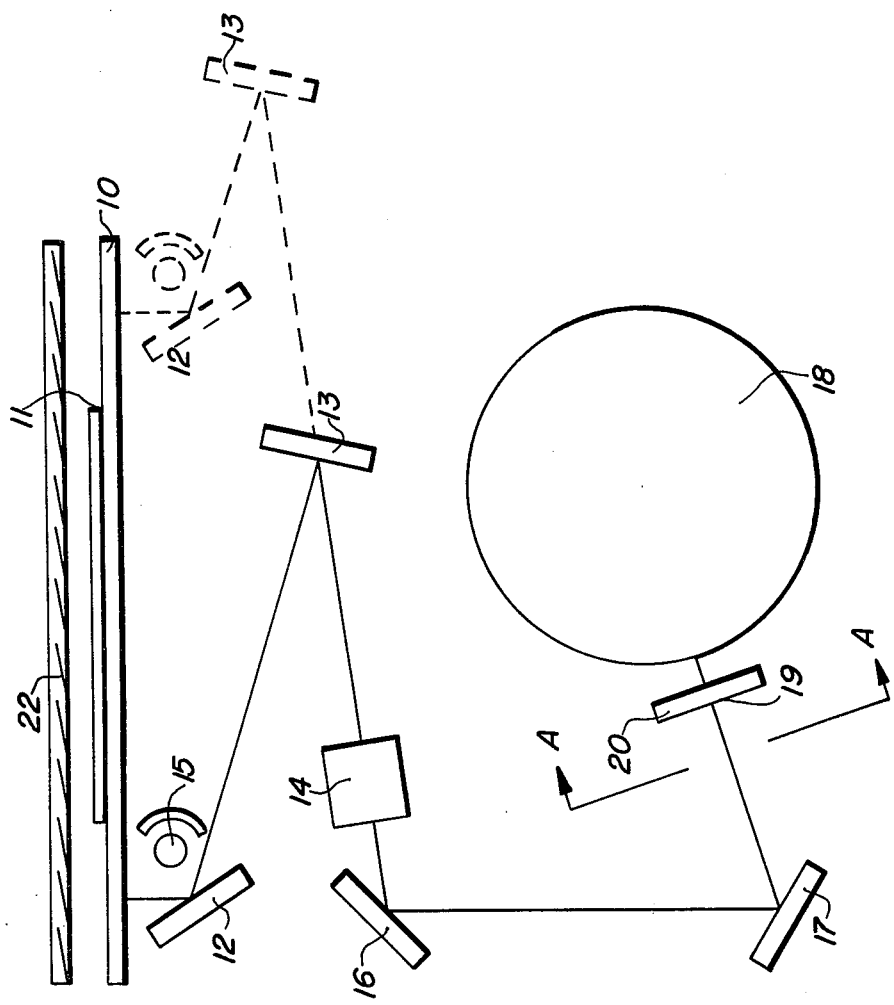
FIG. 1 shows a schematic view of an optical scanning system.

Referring to the drawing, a platen 10 is provided to support a document 11. A scanning mirror system includes two movable mirrors 12 and 13 shown in their extreme left and right positions in full and dotted outline respectively. The mirror 13 is arranged to move at half the speed of the mirror 12 during scanning to maintain the optical distance constant between the document 11 and a lens 14. A tubular lamp 15 extending across the platen 10 parallel to the mirror 12 moves with the mirror 12. The lamp 15 is provided as illumination means to illuminate the document 11 through the platen 10 during scanning.

An optical path extending from the platen 10 to the lens 14 continues beyond the lens to be reflected in sequence by mirrors 16 and 17 towards a photoreceptor drum 18. An optical slit 19, better seen in FIG. 2, is provided in a cover plate 20. The slit is required to restrict the image field and thus preserve image quality. A light intensity detector 21, see FIG. 2, is mounted on the plate 20 adjacent the slit 19.

A platen cover 22 comprising a plurality of juxtaposed angled mirrors is provided above the platen and will be described in more detail below.

The configuration or shape of the slit is as shown, being narrower at its mid-point than at its extremities. This shape as is already known in the art, is to compensate for the uneven distribution of illumination inherent in the lamp 15. Other shapes can be provided for lamps having different distribution characteristics. The photoreceptor 18 may be as fully described and illustrated in U.S. Pat. No. 3,084,043 in which a latent image is formed xerographically on the photoreceptor 18 and then developed by a liquid development process.

In general operation, the document 11 is scanned by the sweep of the mirrors 12 and 13 from left to right transferring a latent image of the document onto the photoreceptor 18 which rotates in synchronism with the movement of the mirrors 12 and 13. The intensity of illumination incident on the document in the present example is determined by the magnitude of current supplied to the lamp 15. It is necessary to provide as far as possible constant irradiance at the image plane, that is, at the surface of the photoreceptor. Thus, to provide good copies of originals of widely differing reflectance properties arrangement must be made to alter the illumination of the originals according to their deflectance. In the embodiment, this is achieved by a pre-scan of the document 11 and by controlling the current to the lamp 15 in dependence upon the maximum intensity of light received at the detector 21 throughout the pre-scan.

At the beginning of the pre-scan, light from lamp 15 travels through the platen 10 and is reflected at an angle back through the platen towards the mirror scanning system, that is the mirrors 12 and 13. The reflected light follows the optical path and falls generally on the cover plate 20. The angle of the platen cover 22 is such that directly reflected light from the platen cover 22 does not fall on the detector 21. In other words the directly reflected light is not in the line-of-sight of the detector 21. Thus, the intensity of light falling directly on the platen cover 22 is comparatively low although during this time the intensity of light falling on the photoreceptor is maintained at relatively high level, being a reflection of the lamp 15.

As the pre-scan continues, in the embodiment described, the mirror 12 moves to a position below the document 11. In this position light from the lamp 15 is reflected from the surface of the document 11 and along the optical path to the photoreceptor 18. The image of the document falls across the plate 20 embracing the line-of-sight of the detector 21. Thus, the intensity of illumination reflected from the document can be sensed by the detector 21.

Towards the end of the pre-scan, the mirror 12 moves beyond an edge of the document and the light from the lamp 15 is once again reflected by the platen cover 22, at an angle, along the optical path but out of the line-of-sight of the detector 21.

Thus, during the pre-scan the detector 21 receives directly reflected light from the lamp only when the document 11 is in a position to be scanned. The current to the lamp 15 is adjusted (by means not described) in accordance with the intensity of maximum illumination sensed by the detector 21 during the pre-scan.

The latent image provided on the photoreceptor beyond the extremities of the image of the actual document is essentially white and, as the irradiance at the photoreceptor surface is adjusted by this arrangement to a level corresponding to the maximum reflectance of the original document 11, the extremities of the copy developed from the latent image will appear generally the same as the background of the original document.

In the described embodiment the detector 21 is described as being adjacent the photoreceptor 18. This is a preferred position so that any variations or deteriorations of the components of the optical system will be taken into account by the operation of the detector 21. The detector 21 could be placed in some other part of or adjacent to the optical path. The actual position can be compensated for generally by the effective reflective angle of platen cover 22. However, it is understood that it is required that provision can be made to reflect light from the lamp 15 by the platen cover 22 to be out of the line of sight of the detector means but continue to illuminate the photodetector surface.

For example, in the embodiment described we found that satisfactory results were obtained if the platen cover 22 was arranged to reflect light at from 4° to 7° to the normal to the plane of the platen 10.

Figure 3:
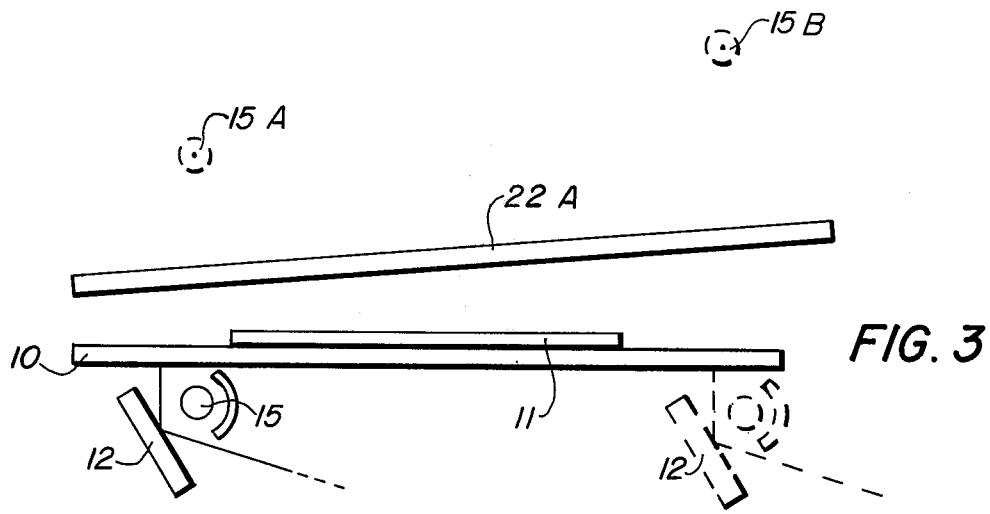
FIGS. 3 and 4 show schematically some other forms of platen cover.
Figure 4:
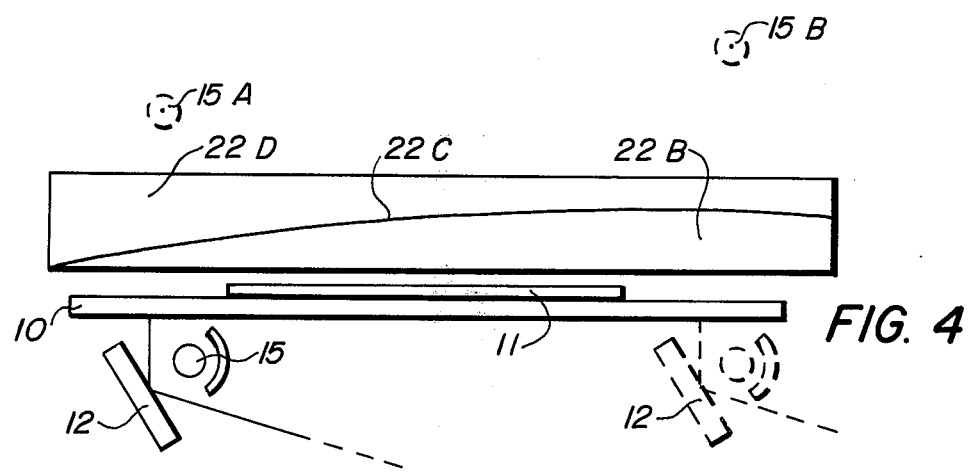

It will be appreciated that other forms of platen covers can be provided. A plane mirror for example may be used positioned to reflect light back through the platen 10 at an angle to the normal of the platen 10. As stated above such an angle in the described optical configuration should be 4° to 7° to the normal. In FIG. 3, a platen cover 22A comprises a plane mirror. Virtual images of the lamp 15 in its two extreme positions are shown at 15A and 15B. In a further configuration in FIG. 4, the platen cover comprises a transparent curved wedge 22B having a reflecting upper surface 22C and a protective backing member 22D. The virtual images 15A and 15B of the lamp 15 are shown as before.

The reflective efficiency of the platen cover may be low, of the order of 20% for example, although the lower the efficiency the darker the extremities, if any, beyond the true copy of the original, will be on the copy provided. Somewhat darkened extremities may be acceptable in some instances because the arrangement ensures that a satisfactory exposure of the actual document is achieved. In any event, it is envisaged that platen cover surfaces made of materials including aluminum, stainless steel, chromium plating and other surfaces treated with reflective paints will provide satisfactory results.

The platen cover 22 need not be near to the surface of the document to be copied. If a thick original document is to be copied, an expansible hinge or similar arrangement could be provided. However, it is required as has been explained that when the platen cover is in an operative position even though the platen cover may be remote from the platen, the effect of its lower surface is to reflect light from the document illuminating means at an angle to the normal of the surface of the platen 10 such as to avoid the line of sight of the detector 21 but to impinge on the surface of the photoreceptor. The actual angle or range of angles chosen depends on the relative position of the slit and light detecting device and the overall optical configuration.

While the invention has been described with reference to the structures disclosed, it is not confined to the details set forth, but is intended to cover such modifications or changes as may come within the scope of the following claims.

What is claimed is:

1. An optical system for projecting an image of an object to be copied including:
   object illuminating means to illuminate said object at an object surface,
   means to project an image of said object along an optical path to an image surface,
   a light intensity detector disposed adjacent to said optical path and in optical communication with said object,
   a cover disposable over said object, on the side thereof opposite said illuminating means and said light intensity detector, and configured to reflect light from said illuminating means in direction other than toward said light intensity detector.

2. An optical system for projecting an image of an object to be copied including:
   object illuminating means to illuminate said object at an object surface,
   means to project an image of said object along an optical path to an image surface,
   a light intensity detector disposed adjacent to said optical path and in optical communication with said object,
   a reflective cover disposable over said object, on the side thereof opposite said illuminating means and said light intensity detector, and having a reflective surface disposed te reflect light from said illuminating means at an angle to the normal to said object surface so that light from said illuminating means reflected by said reflective cover propagates in direction different from that of light reflected by said object.

3. An optical system as claimed in claim 2 in which said reflective cover includes a plurality of juxtaposed parallel and offset reflective surfaces.

4. An optical system as claimed in claim 2 in which said reflective cover includes a reflective surface which is curved relative to said object surface.

* * * * *